July 31, 1956  J. H. LITTLE  2,756,663
HEATING AND DEFROSTING APPARATUS
Filed Nov. 1, 1952  7 Sheets-Sheet 1

Inventor
John H. Little
By Willits, Helwig & Baillio
Attorneys

July 31, 1956  J. H. LITTLE  2,756,663

HEATING AND DEFROSTING APPARATUS

Filed Nov. 1, 1952  7 Sheets-Sheet 4

Inventor
John H. Little
By Willits, Helmig & Baillio
Attorneys

United States Patent Office 2,756,663
Patented July 31, 1956

2,756,663

HEATING AND DEFROSTING APPARATUS

John H. Little, Huntington Woods, Mich., assignor to General Motors Corporation, Detroit, Mich., a corporation of Delaware Application November 1, 1952, Serial No. 318,249

6 Claims. (Cl. 98—2)

This invention relates to improvements in vehicle heating defrosting apparatus of the general type disclosed in my copending application Serial No. 276,807, filed March 15, 1952, for Heating and Defrosting Apparatus.

Various forms of heating, ventilating, and defrosting units are now employed in motor vehicles but few if any are capable of performing all of the functions required of such apparatus in a simplified and efficient manner. In order to make the adjustments required to properly heat or ventilate a vehicle it has been necessary heretofore either to provide complicated controls which increase considerably the cost of manufacture or a multiplicity of separate controls which may be extremely difficult to operate especially while the vehicle is in motion.

One object of the present invention is to provide a highly improved and simplified apparatus for heating and ventilating the vehicle and also for defrosting or defogging the windshield.

Another object is to provide an improved control mechanism for the fresh air and recirculating air control valves of the apparatus thereby not only increasing the efficiency of the apparatus but reducing the manufacturing cost thereof.

A further object is to provide in apparatus of the stated character, a novel valve control mechanism which operates the air control valves in a predetermined sequential order to permit heating and circulating of fresh air, heating and recirculating the air within the vehicle, or causing fresh air to flow directly into the vehicle without first passing through the heating core.

Other and further objects of the invention will become apparent as the description of the invention progresses.

Figures 1, 2:
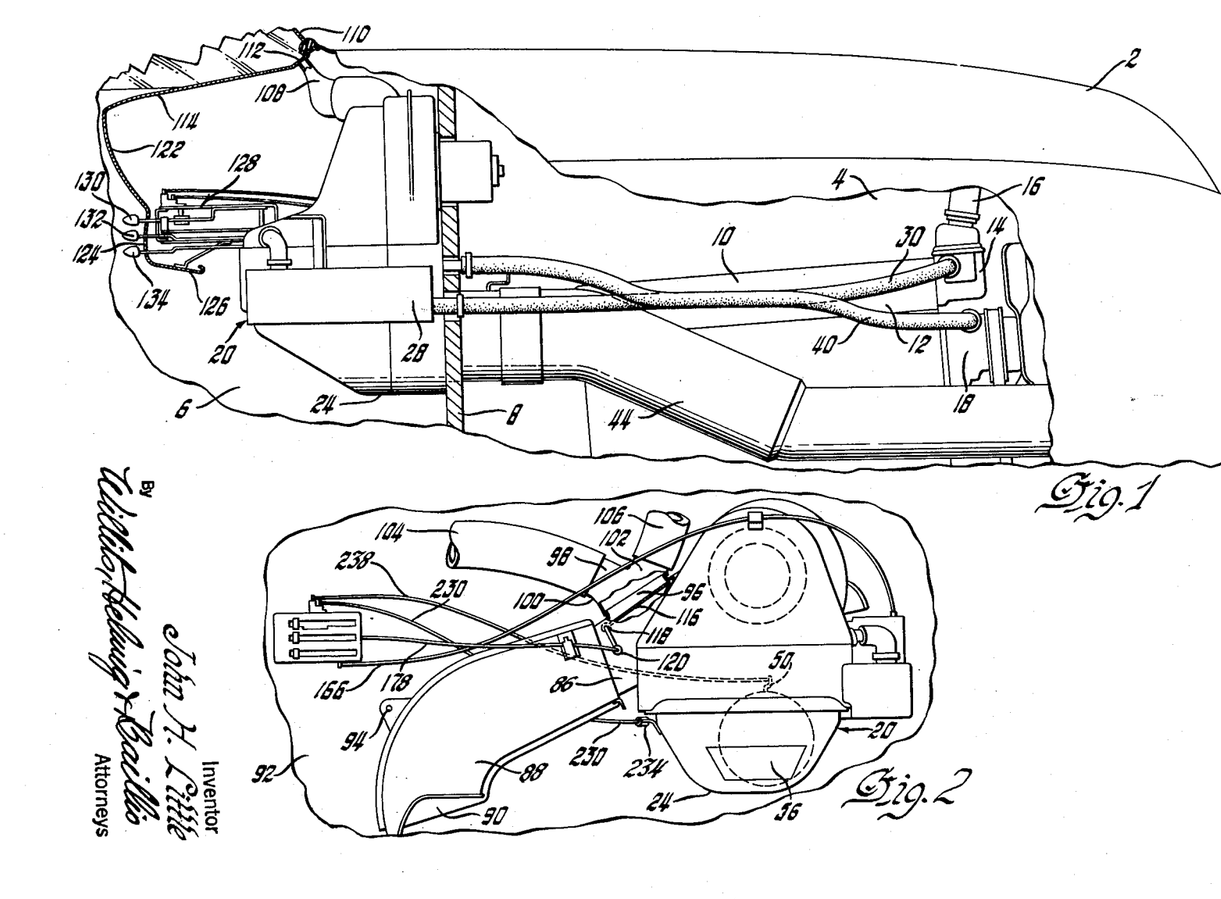
Fig. 1 is a fragmentary view of the front portion of a motor vehicle showing the complete apparatus comprising the present invention.
Fig. 2 is a side elevational view of the heating, ventilating, and defrosting apparatus comprising the present invention and showing the various control means associated therewith.
Figure 11:
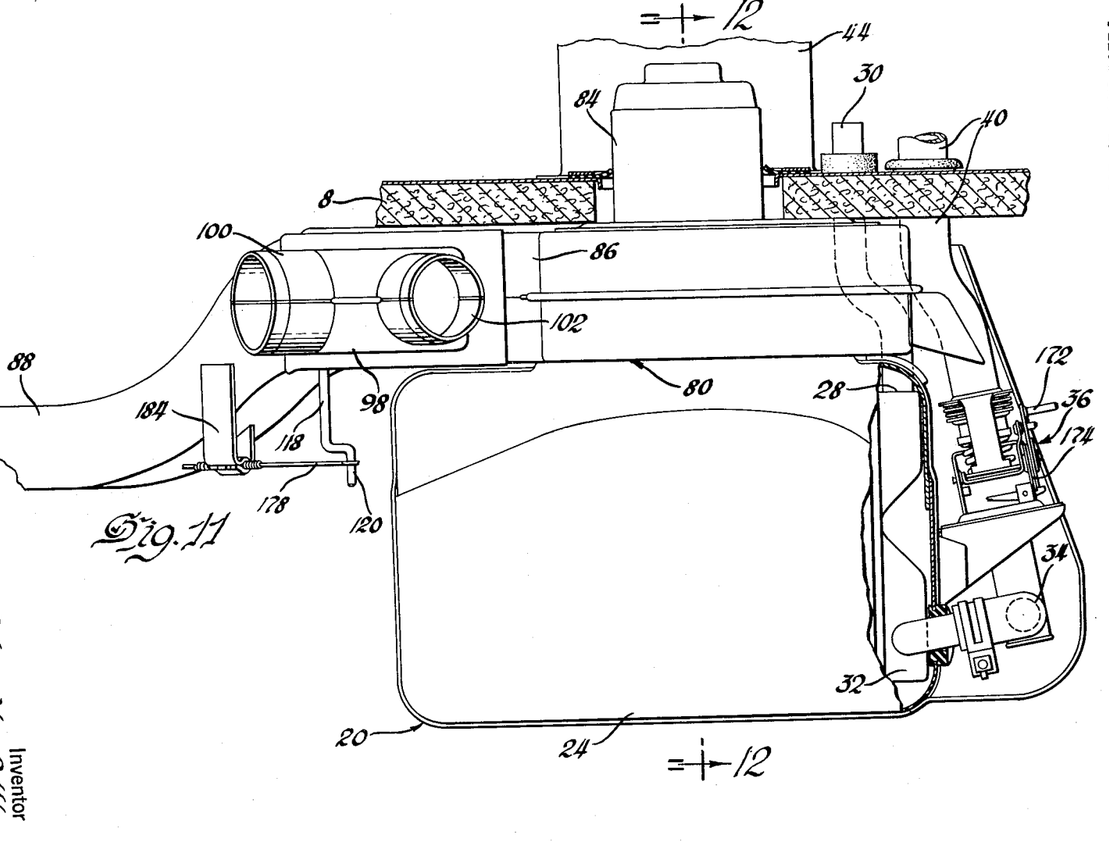
Fig. 11 is a plan view of the heating, ventilating, and windshield defrosting apparatus, certain parts being broken away to illustrate more clearly certain structure thereof.
Figure 12:
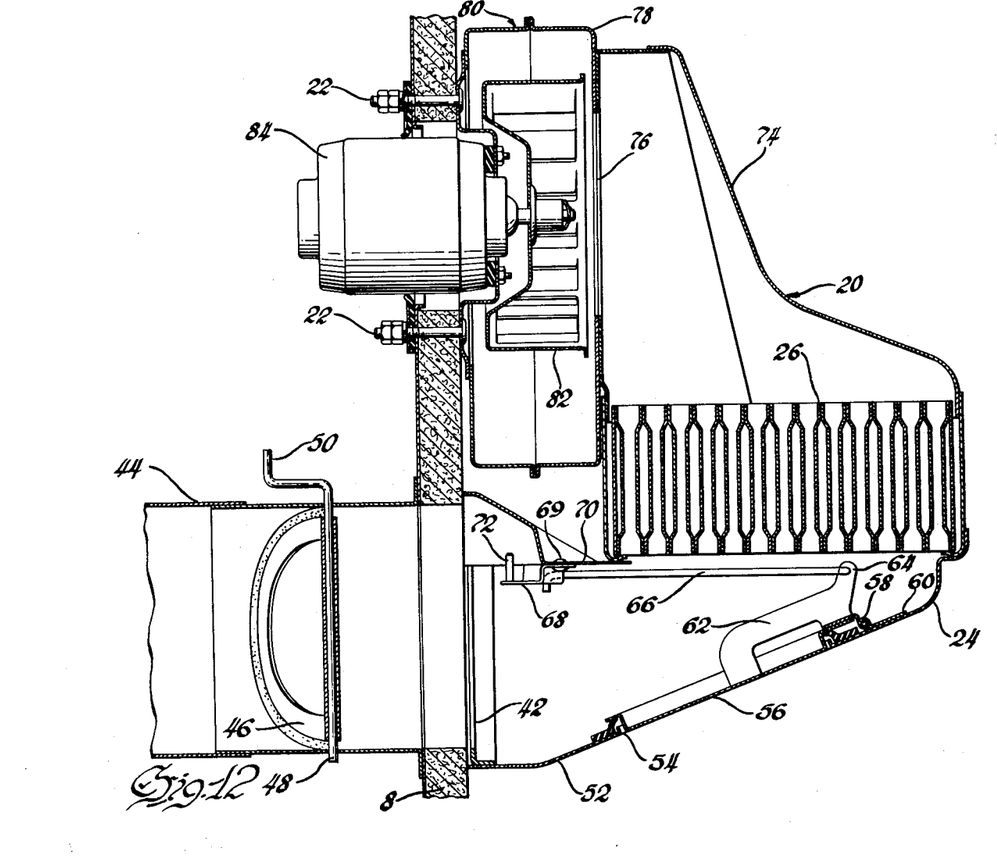
Fig. 12 is a sectional elevational view taken through the casing of the apparatus, said view being taken substantially along line 12—12 of Fig. 11.

Referring more particularly to Fig. 1, the numeral 2 indicates generally a motor vehicle having an engine compartment 4, a passenger compartment 6, which are separated by the usual dash or fire wall 8. An internal combustion engine 10 is mounted in compartment 4 in the usual manner and has associated therewith a jacket 12 for a liquid coolant. Jacket 12 is connected by the usual fitting 14 having a thermostatically controlled valve therein, not shown, which fitting is connected in the usual manner to the radiator, not shown, by piping 16. The radiator is connected in the usual fashion by piping connections, not shown, to a liquid circulating pump 18 which returns the liquid coolant to the jacket 12. The heating, ventilating, and windshield defrosting apparatus is indicated generally by the numeral 20 and is secured to the passenger compartment side of the fire wall 8 by any suitable means, as for example the volts 22 shown more particularly in Fig. 12. The apparatus 20 includes a casing 24 having a heating core 26 mounted therein, as shown more particularly in Fig. 12. The outlet fitting 14 associated with engine 10 is connected to the inlet end 28 of heating core 26 by a flexible pipe connection 30. The outlet end 32 of heater 26 is connected by suitable piping 34 to a thermostatically controlled valve mechanism indicated generally at 36 as shown more clearly in Fig. 11. Thermostatically controlled valve mechanism 36 is connected to the pump 18 by piping 40. Accordingly, upon operation of engine 10, heated liquid coolant will flow from fitting 10 to heating core 26 through pipe 30, thence to the thermostatically controlled valve structure 36 through piping 34 and is then returned to the engine 10 by circulating pump 18 through return piping 40. The thermostatically controlled valve may be adjusted to permit the proper amount of heating liquid to flow through the heating core 26 and thereby control the temperature conditions in the passenger compartment 6. Thermostatically controlled valve structure 36 may be of any suitable construction and for a complete disclosure of a device of this character which is commonly used in apparatus of this type, reference may be had to the copending application of Rodney M. Johnston, Serial No. 219,655, filed April 6, 1951.

Fresh air may enter the inlet end 42 of the casing 24 of the apparatus 20 through an air duct 44. Duct 44 extends lengthwise of the engine compartment 4 and is secured in position by any suitable means. Duct 44 has provided therein near the fire wall 8 a valve 46 which is pivotally mounted on a rod 48 having an operating crank 50 at the upper end thereof. The bottom wall 52 of casing 24 has an opening 54 provided therein which is normally closed by a door or valve 56 pivoted on a pintle 58 mounted in a bracket 60 secured by welding or other means to the inner surface of wall 52. Valve 56 has secured to the inner surface thereof a bracket 62 having an arm 64 provided at the upper end thereof to which one end of an operating link 66 is pivotally connected. The other end of link 66 is pivotally connected to one end of lever 68 pivoted at 69 to an interior wall 70 of casing 24. The other end of lever 68 has provided thereon a pin 72 to which an operating member may be attached, as will appear more fully hereinafter. As shown more particularly in Fig. 12, the heating core 26 is mounted intermediate the top and bottom of the casing 24 and is supported therein an any suitable manner. The upper wall 74 is irregular shaped and directs the air flowing upwardly through core 26 to a blower inlet opening 76 provided in the casing 78 of a blower mechanism indicated generally by the numeral 80. Blower 80 consists of a fan member 82 driven by an electric motor 84. The casing 78 of blower 80 has secured thereto a discharge duct 86 to which is connected a distributing duct 88. Duct 88 is arranged to discharge the air flowing therethrough through a discharge opening 90 which may be disposed midway between the side walls of the passenger compartment or at any other desired location. Duct 88 may be secured to the floor board 92 of the vehicle by bolts 94 or by any other suitable means. The discharge duct 86 of blower 80 has a discharge opening 96 provided at the upper end thereof to which a fitting 98 may be secured. Fitting 98 comprises two branch outlets 100 and 102 which are connected by flexible pipe connections 104 and 106, respectively, to nozzle connections 108 which direct the air upwardly along the inner surface of the windshield 110, air openings 112 communicating with said nozzles being provided in the upper end of the instrument panel indicated generally at 114.

Discharge opening 96 in duct 86 may be closed by a valve 116 pivotally mounted on a pin 118 having a crank arm 120 at one end thereof to which an operating member may be connected, as will presently appear. When valve 116 is in the position shown in Fig. 2 all of the air discharged by blower 80 will flow into distributing duct 88 and thence into the passenger compartment 6 through opening 90. By adjusting damper 116 all or only a desired portion of the air discharged by blower 80 may be directed either to duct 88 or to fitting 98 from which it may flow upwardly to the windshield for defrosting purposes.

Figure 3:
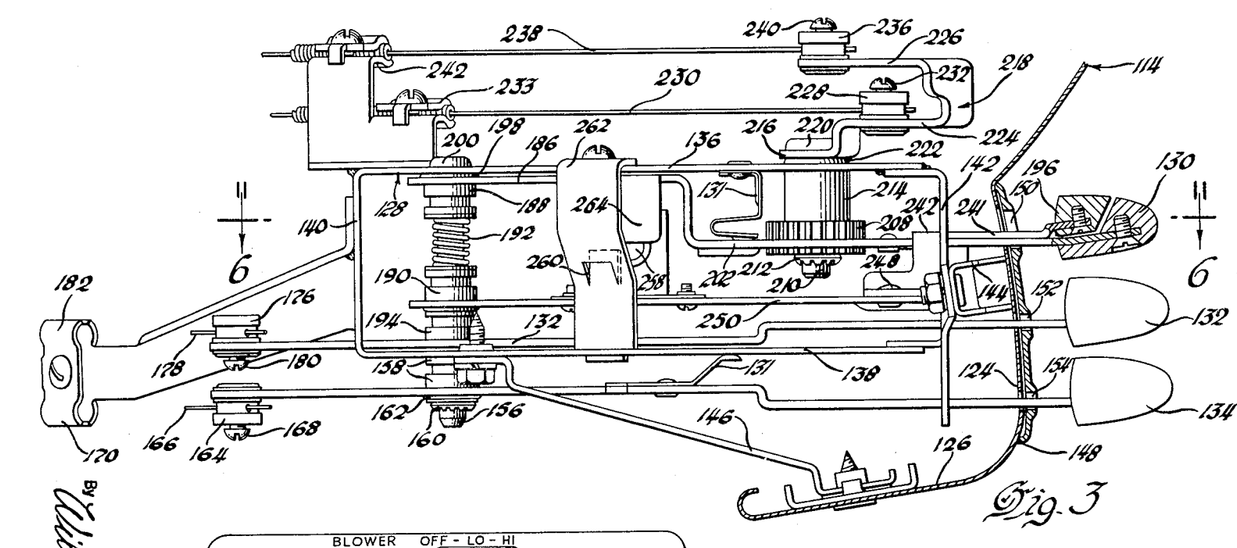
Fig. 3 is a side elevational view, partly in section, of the various control levers for the air control valves, the temperature control unit and the blower motor switch associated with the apparatus.

The instrument panel 114 is bent downwardly and forwardly as shown at 122 and then vertically downwardly as shown at 124 and then forwardly as shown at 126. Mounted in a bracket 128 and extending through suitable elongated slots provided in the vertical portion 124 of instrument panel 114 are three control levers 130, 132, and 134. Bracket 128 consists of top and bottom wall 136 and 138 and end walls 140 and 142. End wall 140 may be integral with top and bottom walls 136 and 138. End wall 142 may be secured to top and bottom walls in any suitable manner such as by welding. The rear wall 142 of bracket 128 is secured to the substantially vertical portion 124 of instrument panel 114 by a bracket 144. The bottom wall 138 of bracket 128 is secured to the forwardly extending portion 126 of the instrument panel by a second bracket 146. Bracket 128 therefore is effectively held in position on the instrument panel. An escutcheon plate 148 is secured to the vertical portion 124 of instrument panel 114 and has provided therein three vertically spaced substantially parallel guide slots 150, 152, and 154 which register with corresponding slots provided in the said vertical portion 124 and which receive, respectively, controlled levers 130, 132, and 134. As shown more particularly in Fig. 3, control lever 134 is pivotally mounted near the lower end of a pin 156 secured in aligned apertures provided in the top and bottom walls 136 and 138, respectively, of bracket 128. Lever 134 is held in spaced relation with bottom wall 138 by spacing washers 158 and is held against downward movement by a Tinnerman nut 160 and a washer 162. The forwardly disposed end of lever 134 has a bracket 164 secured thereon to which one end of Bowden cable 166 is secured by means of a machine screw 168. Bowden cable 166 is held in position on a bracket 170 secured in any suitable manner as by welding to the end wall 140 of bracket 128. The other end of Bowden cable 166 is attached to a pin 172 secured to the upper end of a control cam member 174 for adjusting the thermostatically controlled valve 36. By manipulation of lever 134 in slot 154 the temperature conditions in the passenger compartment 6 of the vehicle may be varied.

Figure 4:
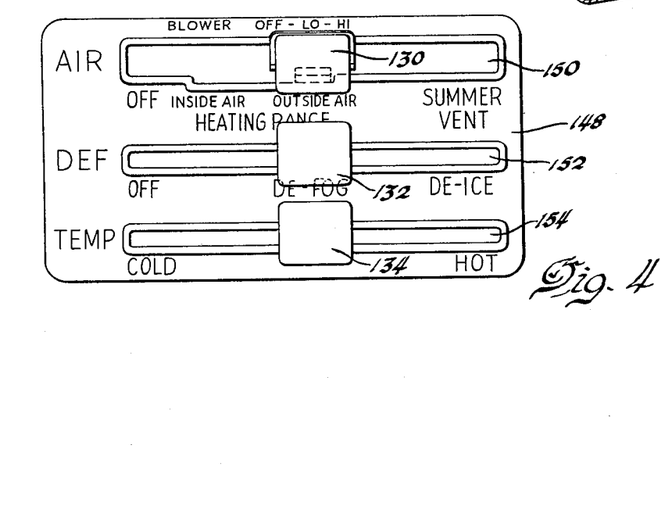
Fig. 4 is an elevational view of the escutcheon guide plate for the various control levers having indicated thereon the various positions of adjustment of the control levers.

Referring to Fig. 4, it will be observed that escutcheon plate 148 has legend Temp. at the left-hand end of slot 154 which indicates temperature. Beneath slot 154 the legend Cold appears at the left-hand end thereof and the legend Hot at the other end. Accordingly, when lever 134 is positioned at the left-hand end of slot 154, the thermostatically controlled valve has been adjusted to closed position thereby shutting off the flow of the heating medium to the core 26 of unit 20. When the lever has been swung to the other extreme position opposite the legend Hot the valve is fully opened and substantially free flow of heating liquid is permitted through the core 26. When the lever is in an intermediate position the thermostatic control valve unit is conditioned for temperature conditions between the two extremes.

Lever 132 is also pivotally mounted on pin 156 and is disposed near bottom wall 138 of bracket 128. Lever 132 also has a bracket 176 secured to the forwardly disposed end thereof to which a second Bowden cable 178 is secured by means of a screw 180. Bowden cable 178 is secured at the opposite side 182 of bracket 170 and the other end thereof is secured to the crank arm 120 of pivot pin 118 which controls the operation of valve 116. Cable 178 is held in position near pin 118 by a bracket 184 secured to distributing duct 88 in any suitable manner as by welding. It therefore is seen that by manipulation of lever 132 is slot 152 valve 116 may be actuated from the position shown in Fig. 2 to a position disposed substantially at right angles thereto which substantially shuts off the flow of air from duct 86 to distributing duct 88 and permits substantially all of the air discharging from blower 80 to flow to fitting 98 and thence to the nozzles 112 disposed adjacent the windshield. As shown in Fig. 4, slot 152 for lever 132 has the legend Def. inscribed at the left-hand end thereof which indicates defrost. The legend Off appears beneath the end of slot 152, De-fog appears between the ends of said slot, and De-ice appears near the right-hand end thereof. Accordingly, when lever 132 is in the left-hand position opposite the legend Off, damper 116 is in the position shown in Fig. 2 thereby shutting off the flow of air to the windshield 110. When lever 132 is in a mid position opposite the legend De-fog, damper 116 has been moved by Bowden cable 178 to an intermediate position permitting some of the air to flow to the windshield and the remaining air to flow into distributing duct 88. When lever 132 is at the extreme right-hand position in slot 152 opposite the legend De-ice, valve 116 has been actuated by cable 178 to a position substantially at right angles to that shown at Fig. 2 thereby causing substantially all of the air discharging from blower 80 to flow to the windshield 110.

Lever 130 is also pivotally mounted on pin 156 and the forward end thereof is disposed immediately beneath the top wall 136 of bracket 128. Spacing washers 188 and 190 are disposed between lever 132 and the forward portion 186 of lever 130 and are resiliently held in position by coil spring 192. Spacing washers 194 are also disposed between lever 132 and a switch operating lever 196 (Fig. 3), the latter of which also being pivotally mounted on pin 156. A spacing washer 198 is disposed between portion 186 of lever 130 and the lower surface of top wall 136. The head 200 of pin 156 prevents downward movement of the latter. It therefore is seen that levers 130, 132, 134, and 196 are effectively held in spaced relation and, accordingly, proper operation thereof is assured.

Lever 130 is provided with an enlarged portion 202 intermediate the ends thereof which portion is provided with an elongated, vertically disposed, substantially arcuate slot 204. The right-hand side (Fig. 6) of slot 204 is provided with rack teeth 206 which mesh with a pinion 208 secured to a shaft 210 journalled at the upper end thereof in any suitable bearing provided in the top wall 136 of bracket 128. Pinion 208 is secured against downward movement on shaft 210 in any suitable manner as by Tinnerman nut 212. A spacing sleeve 214 extends between the upper surface of pinion 208 and the lower surface of top wall 136 of bracket 128. Sleeve 214 bears against the under surface of top wall 136 and thereby prevents lateral movement of the shaft and pinion during operation thereof. Shaft end 210 near the upper end thereof is secured in any suitable manner to one end 216 of a substantially U-shaped crank arm 218. Guide washers 220 and 222 mounted on the upper shaft 210 and disposed at the opposed sides of the portion 216 of crank 218 assure proper operation of the latter. Crank arm 218, as shown more particularly in Figs. 3 and 7 to 10, is bent substantially U-shaped to form a pair of offset arms 224 and 226. Arm 224 has rotatably mounted thereon intermediate the ends thereof a bracket 228 to which one end of a Bowden cable 230 is secured by means of a screw 232. Bowden cable 230 is supported in position in a bracket 233 secured in any suitable manner as by welding to top wall 136 of bracket 128. The other end of Bowden cable 230 is secured to the pin 72 attached to the operating lever 68 for valve or door 56. Cable 230 is supported on the casing 24 of heating unit 20 by bracket 234, as shown in Fig. 2. The other arm 226 of crank 218 has rotatably mounted at the free end thereof a bracket 236 to which one end of a Bowden cable 238 is secured by means of a screw 240. Cable 238 is supported in spaced relation with cable 230 at the upper end 242 of bracket 233. The other end of cable 238 is attached to the crank 50 disposed at the upper end of the pivot pin 48 for valve 46. Brackets 228 and 236 are offset and circumferentially spaced on crank 218 as is shown more clearly in Figs. 7 to 10 and are so spaced that when the air control lever 130 is in its Off position, valve 56 will be opened to its fullest extent and the outside air valve 46 will be fully closed.

Referring to Fig. 4, slot 150 of escutcheon plate 148, it will be observed has the legend Air inscribed at the left-hand end thereof. Beneath slot 150 the legend Off appears near the left-hand end thereof, the legend Inside Air spaced to the right of the legend Off, the legend Outside Air spaced to the right of the legend Inside Air, and the legend Summer Vent being provided near the right-hand end. The spacing of the brackets 228 and 236 on crank 218 is such that a single crank arm may be employed to operate the valves 56 and 46 to their various positions of adjustment between the Off position and Summer Vent position shown on the escutcheon plate 148. When the parts are in the position shown in Fig. 7, as pointed out before, valve 56 is in its fully open position and valve 46 is in its fully closed position. Upon movement of lever 130 from the Off position to the Inside Air position rack 206 will have rotated pinion 208 and shaft 210 and consequently crank 218 to the position shown in Fig. 8. During this movement of crank arm 218, it will be noted that the movement of cable to the left or toward the closed position of valve 46 is very slight and consequently no opening movement will have been imparted to the valve 46. Bracket 228, however, has been moved slightly to the right thereby exerting a slightly closing movement on valve 56. This action simply moves the valve 56 away slightly from the lower end of heating core 26 and thereby permits a freer flow of air through the heating core than would be the case had the valve remained in its fully opened position. The air from within the passenger compartment may now flow through opening 54 and through the heating core and be conducted either through distributing duct 88 or to fitting 98, depending upon the position of valve 116. Upon movement of lever 130 to the Outside Air position of adjustment, shown in Fig. 9, it will be noted that bracket 28 will have actuated cable 230 a fairly substantial distance to the right which movement causes operation of valve 56 to its fully closed position. It will also be observed that bracket 236 has also actuated cable 238 a fairly substantial distance to the right thereby opening outside air valve 46 and permitting outside air to be circulated through the unit 20. Upon movement of lever 130 to the Summer Vent position, it will be observed that bracket 236 will have moved its cable 238 only a short distance to the right thereby causing the valve 46 to remain in substantially fully open position. Bracket 228 on the other hand, as will be shown in Fig. 10, will have been moved a relatively great distance to the left thereby causing its cable to fully open valve 56. Inasmuch as both the outside air valve 46 and the recirculating air control valve 56 are now in fully open position, outside air may flow directly into the passenger compartment of the vehicle through duct 44, the lower end of casing 24, and opening 54. When valve 56 is in its fully open position it acts as a deflector for the air entering the casing through duct 44 and tends to deflect it through the discharge opening 54. The movement of lever 130 from the Off position to Summer Vent position causes rotation of pinion 208 and crank arm 218 through an angle of substantially 270 degrees. Upon movement of lever 130 back to its off position crank 218 will cause the cables 230 and 238 to operate the fresh air valve 46 to fully closed position and the recirculating air valve 56 to fully open position, the parts then assuming the position shown in Fig. 7. An anti-rattle spring member 131 is connected to upper wall 136 of frame 128 and engages lever 130. A second anti-rattle device is connected to lever 134 and engages lower wall 138.

Figure 6:
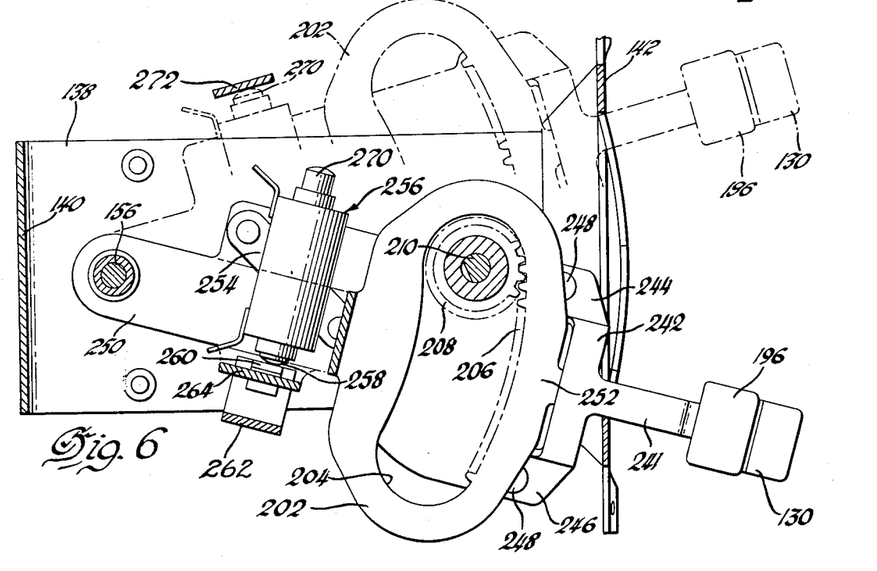
Fig. 6 is a sectional plan view of the control mechanism taken substantially along line 6—6 of Fig. 3.
Figure 7:
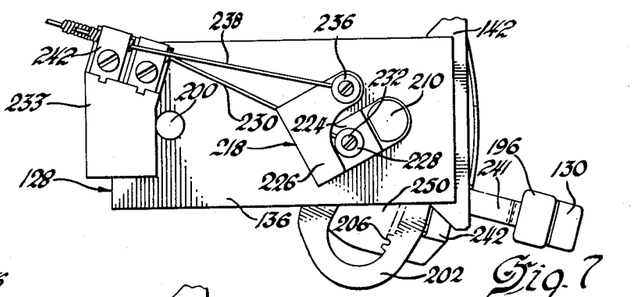
Fig. 7 is a plan view of the control mechanism showing the air control and blower motor control switch operating levers in one position of adjustment.
Figure 8:
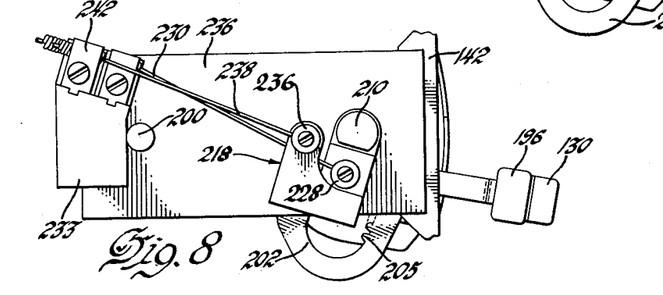
Fig. 8 is a view similar to Fig. 7 showing the air control and switch control levers in a second position of adjustment.
Figure 9:
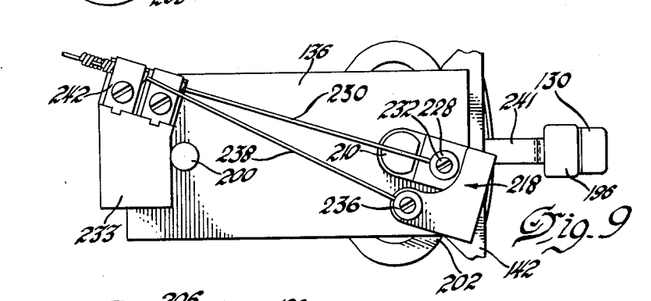
Fig. 9 is a view similar to Figs. 7 and 8 showing the position of the air control and blower motor switch operating levers and associated parts in a third position of adjustment.
Figure 10:
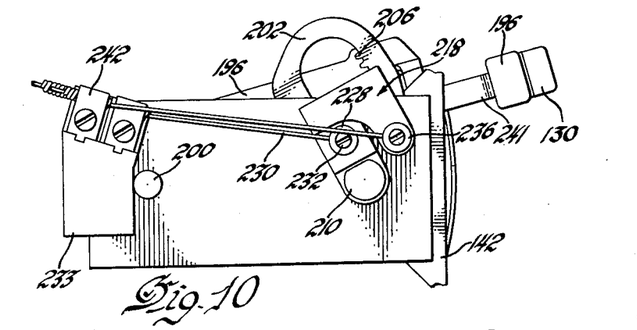
Fig. 10 is a view similar to Figs. 7 to 9, but showing the control and switch levers and associated parts in a fourth position of adjustment.

In order to control the air flow through the unit, a control mechanism has been provided for blower motor 84. As shown more particularly in Fig. 3, the right-hand or rear portion of switch operating lever 196 overlies and is supported on the right-hand portion of lever 130. Lever 196 is substantially T-shaped, having a reduced outer portion 241 and a narrow transverse portion 242 disposed adjacent the enlarged portion 202 of lever 130. The opposite ends of transverse portion 242 are bent downwardly as shown at 244 and 246 and the ends thereof are secured by rivets 248 or other fastening means to the right-hand end of an extension 250 of lever 196. The reduced portion 252 of lever 130, as shown in Fig. 6, therefore is spaced from the end portions 244 and 246 thereby permitting relative movement between levers 130 and 196. The left-hand or forward end of portion 250 of lever 196 is pivotally mounted on pin 156, as previously described. The upper surface of extension 250 of lever 196 has secured thereto in any suitable manner, such as by bracket 254, a double plunger type of switch 256. The plunger 258, disposed at one end of switch 256 when the levers 130 and 196 are in the Off position, engages a tab 260 struck out from a cross member 262 secured in any suitable fashion to top and bottom walls 136 and 138 of bracket 128. When the plunger 258 is in this position the circuit to blower motor 84 is interrupted. Upon movement of levers 130 and 196 to the Inside Air position, plunger 258 moves away from the stationary tab 260 by spring 296 (Fig. 13) provided within the switch a predetermined distance until it engages a tongue 264 depending from the inner portion 186 of lever 130. Plunger 258 is thereby stopped against further movement. However, the movement of plunger 258 is sufficient to close the switch, thereby completing the circuit to motor 84 through a resistance coil 268 in the circuit, Fig. 13.

Figure 5:
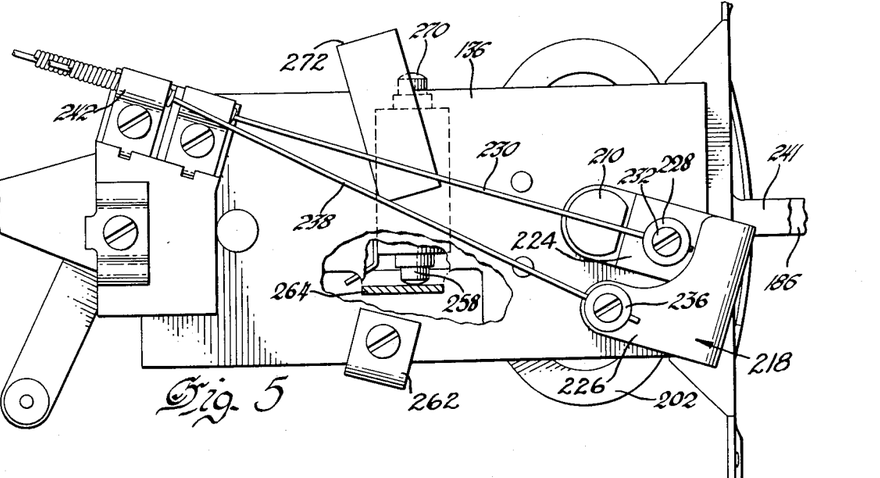
Fig. 5 is a plan view, partly in section, of the control unit, certain parts being broken away to more clearly show certain features thereof.

Inasmuch as levers 130 and 196 move in unison, upon movement of these levers to the outside air position, the circuit to motor 84 will remain closed and consequently no change in operation will take place, the parts remaining in the position shown in Fig. 5. Upon movement of the levers 130 and 196 to the Summer Vent position, the upper plunger 270 of switch 256 will engage a cross member 272 secured to top and bottom walls 136 and 138 of bracket 128, thereby opening switch 256 and breaking the circuit to motor 84.

When the lever 130 is in either the Inside Air or Outside Air positions of adjustment it sometimes is desired to actuate the blower at a greater speed. This may be accomplished by moving lever 196 in a clockwise direction (Figs. 5 and 6), relative to lever 130 thereby moving switch 256 away from the stop arm 264 provided on lever 130. When this occurs, the plunger 258 is moved by spring 296 to a greater extent thereby cutting out resistance 268 and consequently causing an increase in speed of motor 84. It also might be desirable when lever 130 is in either the Inside Air or Outside Air positions of adjustment to interrupt the circuit to the motor 84. This may be done by swinging lever 196 in a clockwise direction, Figs. 5 and 6, causing plunger 258 to be moved inwardly by pressure on stop tab 264. By this action the effect is the same as when plunger engages stop tab 260 when both levers are in the Off position, shown in Fig. 6.

Figure 13:
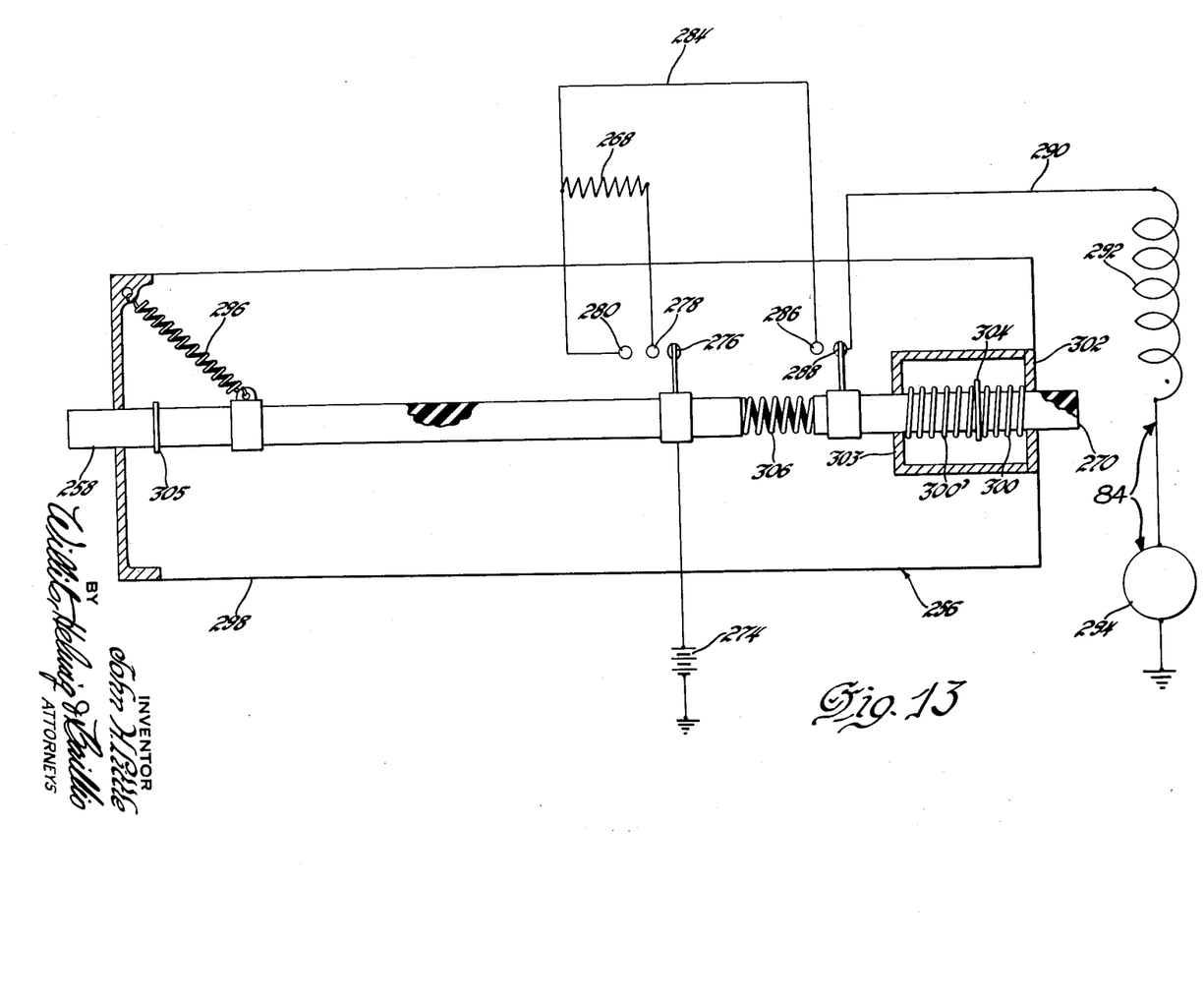
Fig. 13 is a wiring diagram of the electrical circuit for the blower motor of the unit including the control switch.

Fig. 13 shows a simple control circuit for motor 84, in which a source of electric power, as a battery 274 is connected at one end to ground and at the other end to a movable contact 276 secured to the insulated plunger 258. Fig. 13 shows the parts when the levers 130 and 196 are in the Off position at which time the circuit to motor 84 from battery 274 is interrupted by engagement of plunger 258 with tab 260. Movable contact 276 is adapted to engage fixed contacts 278 and 280 mounted within the casing of switch 256. Contact 278 is connected to resistance 268 which is connected by a conductor 284 to a third fixed contact 286. Insulated plunger 270 also has a movable contact 288 secured thereto which is adapted to engage fixed contact 286. Contact 288 is connected by a conductor 290 to the field coil 292 of motor 84. Coil 292 is connected to the armature 294 which in turn is connected to ground. A coil spring 296 is connected at one end to plunger 258 and at the other end to the end wall 298 of the casing of switch 256. Centering compression springs 300 and 300' are disposed between the opposite spaced end walls 302 and 303, respectively, of the casing of switch 256 and a spring seat 304 secured to plunger 270. Springs 300 and 300' operate to actuate plunger 270 to bring contact 288 into engagement with contact 286 and to resiliently hold them in this position. When the parts are in the position shown in Fig. 6, the switch and associated parts are in the position shown in Fig. 13 wherein movable contacts 276 and 288 are out of contact with the fixed contacts 278, 280 and 286, respectively associated therewith and the circuit to motor 84 is interrupted. When the levers 130 and 196 are moved to the positions shown in Figs. 8 and 9 spring 296 urges plunger 258 into engagement with tab 264 on lever 130 as shown in Fig. 5, thereby causing contact 276 to engage contact 278. Upon movement of plunger 258 in this manner, plunger 270 will also be actuated by centering spring 300 to bring contact 288 into engagement with fixed contact 286 thereby completing the circuit to the motor 84. To increase the speed of motor 84, lever 196 is swung in a counterclockwise direction (Fig. 6), as previously described, to move plunger 258 away from stop tab 264. When this occurs, spring 296 moves plunger 258 outwardly thereby bringing movable contact 276 into contact with fixed contact 280. Inasmuch as the resistance 282 is now short-circuited, motor 84 will operate at a higher speed. When the levers 130 and 196 are moved to the summer vent positions, shown in Fig. 10, plunger 270 engages stop tab 272 thereby breaking contact between contacts 288 and 286 to interrupt the circuit to motor 84. A stop 305 is provided on plunger 258 to prevent undue outward overtravel of the latter. A spring 306 is disposed between plungers 258 and 270 to permit the latter to move relative to the former when it engages tab 272 while plunger 258 is in engagement with tab 264. Spring 306 also permits movable contact 288 carried by plunger 270 to move to the left (Fig. 13) out of engagement with contact 286 to interrupt the circuit to motor 84 when plunger 270 engages stop tab 272.

It therefore is seen that a simplified and novel control system has been provided which enables operation of the apparatus to properly heat or air condition the interior of the motor vehicle.

While but a single embodiment of the invention has been shown, it is apparent to those skilled in the art that other and further embodiments may be made without departing from the invention. It therefore is to be understood that the invention is to be limited only by the scope of the claims which follow.

What is claimed is:

1. In a device of the class described, the combination of a casing having an air inlet opening and an air discharge opening, a valve for opening and closing said inlet opening, operating means for said valve including a rotatable member journaled in a fixed bracket, means operatively connecting said valve to said rotatable member, a pinion for actuating said rotatable member, a lever pivoted on a fixed axis and having an elongated arcuate slot for receiving said pinion, and a rack disposed along one wall of and concentric with said slot for actuating said pinion.

2. In a device of the class described, the combination of a casing having a pair of air inlet openings and a discharge opening provided therein, a pair of valves, one for each of said openings, a rotatable member for operating said valves, meanas operatively connecting each of said valves to said rotatable member in such a manner that one of said valves is actuated from open to closed and again to open position and the other of said valves is actuated from closed to open position, upon rotation of said rotatable member in one direction, a pinion connected to said rotatable member, a lever having an enlarged slot for receiving said pinion, and rack means provided along one edge of said slot engaging said pinion for actuating the latter.

3. In a device of the class described, the combination of a heater casing, valve means in said casing for controlling the flow of air thereto, a blower for inducing air flow through said casing, an electric motor for operating said blower, a control lever for said valve means movable to a plurality of positions of adjustment, a switch for controlling the operation of said motor, a switch control lever mounted for movement with said control lever, means for supporting said switch on said switch control lever, plunger means extending outwardly from the ends of said switch for controlling the operation of the latter, spring means in said switch to actuate said plunger means to close certain circuits for said motor, stop means engaging one end of said plunger when said levers move to one extreme position to actuate said plunger to interrupt the circuit to said motor, stop means for engaging the other end of said plunger means to actuate said plunger means to interrupt the circuit to said motor when the said levers move toward another extreme position, and said spring means operating to actuate said plunger means to close at least one of said circuits when said levers are moved from either of said extreme positions.

4. In a device of the class described, the combination of a heater casing, valve means in said casing for controlling the flow of air thereto, a blower for inducing air flow through said casing, an electric motor for operating said blower, a control lever for said valve means movable to a plurality of positions of adjustment, a switch for controlling the operation of said motor, a switch control lever mounted for movement with said control lever, means for supporting said switch on said switch control lever, plunger means extending outwardly from the ends of said switch for controlling the operation of the latter, spring means in said switch to actuate said plunger means to close certain circuits for said motor, stop means engaging one end of said plunger when said levers move to one extreme position to actuate said plunger to interrupt the circuit to said motor, stop means for engaging the other end of said plunger means to actuate said plunger means to interrupt the circuit to said motor when the said levers move toward another extreme position, said spring means operating said plunger means to progressively increase the speed of operation of said motor, stop means on said first mentioned control lever for retaining said switch actuating plunger in one circuit closing position whereby said motor is conditioned for operation at one speed, means supporting said levers for relative movement, whereby upon movement of said switch control lever relative to said valve control lever said plunger means is moved away from said last mentioned stop means whereupon the said spring actuates said plunger to another position causing operation of said motor at a higher rate of speed.

5. Apparatus for modifying the heat content of air in a vehicle comprising a casing having an outside air inlet opening, a recirculating air inlet opening and an air discharge opening, a pair of control valves arranged to control said inlet openings, a heat exchange core in said casing and interposed between said inlet openings and said discharge opening, a duct leading to said outside air inlet opening for supplying outside air to said casing, a support, a pinion member journaled on said support, lever means pivotally mounted on said support, mechanical means connecting said lever means to said pinion member to rotate the latter, means eccentrically connecting said pinion member with said valves, and the arrangement being such that with said lever means being placed in one position said recirculating inlet valve is open and said outside air inlet valve is closed, when said lever means is in a second position said recirculating valve is slightly closed and said outside air valve is closed, when in a third position said recirculating valve is closed and said outside air valve is open, and when in a fourth position both air inlet valves are open.

6. The structure substantially as set forth in claim 5 wherein said mechanical means comprises rack means for actuating said pinion member and said eccentrically connecting means includes circumferentially spaced offset attaching portions joined to said pinion member.

References Cited in the file of this patent

UNITED STATES PATENTS

| | | |
|---|---|---|
| 1,303,410 | Stowell | May 13, 1919 |
| 2,605,688 | Hezler | Aug. 5, 1952 |
| 2,627,218 | Katz | Feb. 3, 1953 |
| 2,631,517 | Duhn | Mar. 17, 1953 |
| 2,634,670 | Simons | Apr. 14, 1953 |
| 2,640,407 | Aufiero | June 2, 1953 |